Patented Oct. 28, 1941

2,260,953

UNITED STATES PATENT OFFICE 2,260,953

THIOSTEROID AND PROCESS FOR PRODUCING THE SAME

Rudolph Rebold, New York, N. Y.

No Drawing. Application November 29, 1939, Serial No. 306,647

8 Claims. (Cl. 260—125)

This invention relates to organic compounds of the cyclopenteno-perhydrophenanthrene series, and in particular to sulfur addition products of organic compounds containing the cyclopentenoperhydrophenanthrene nucleus. For simplicity in the statement of the invention, the term "steroids" will be used to designate broadly organic compounds containing the cyclopentenoperhydrophenanthrene nucleus in accordance with well-established practice in the art.

It is a general object of the invention to provide a steroid containing sulfur attached directly to the nucleus of the molecule.

It is another object of the invention to provide a method for producing sulfur addition products of the steroids.

It is a specific object of the invention to provide sulfur addition products of steroids which have metabolic properties.

It is a further specific object of the invention to provide a method for preparing metabolic polysulfides of the steroids which are capable of being absorbed by the skin.

Other objects of the invention will in part be obvious and will in part appear hereinafter.

In accordance with the present invention, a new series of organic compounds having valuable physiological properties are obtained by reacting a steroid and sulfur at an elevated temperature at which an exothermic reaction commences, whereby the sulfur unites with the steroid to form a sulfur-addition product containing not less than two sulfur atoms attached to the nucleus. The new series of compounds have the following general formula:

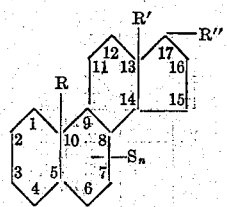

in which S represents sulfur and "$n$" has a value of not less than 2, and in which R is hydrogen, a methyl group or an oxidation product thereof, R' is an alkyl group, and R'' represents hydrogen or an aliphatic (saturated or unsaturated) side chain which may be straight or branched, and which chain may contain hydroxyl, ketonic or carboxyl radicals.

The invention accordingly comprises the several steps and relation of one or more of such steps with respect to each of the others, and the product possessing the features, properties, and the relation of elements, which are exemplified in the following detailed disclosure, and the scope of the invention will be indicated in the claims.

Referring to the above structural formula, the steroids are characterized by having from one to three double bonds which may occur between the carbon atoms 1,2, or 3,4, or 4,5, or 5,6 or 7,8, or 5,10, such steroids being hereinafter referred to in the specification and claims as "unsaturated steroids." It appears that during the reaction of the present invention, one or more of the double bonds break so that sulfur is added directly to the nucleus. For each double bond the number of atoms of sulfur added can be 2, 4 or 6. Where there are more than two atoms of sulfur added for one double bond, it is believed that the sulfur atoms form a ring structure with two of the atoms attached directly to the nucleus as:

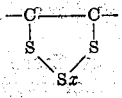

Therefore, the total sulfur added will depend upon the number of double bonds present in the steroid and the amount of sulfur present and available for reaction. Even when there are double bonds in the side chain of the steroid, the sulfur adds only to the nucleus. By limiting the amount of free sulfur available for reaction, less than the total number of double bonds in the steroids can be caused to add sulfur.

The sulfur may be employed initially in any of the forms in which it occurs, such as rhombic sulfur (M. P. 112.8° C.), flowers of sulfur (M. P. 112.8° C.), monoclinic sulfur (M. P. 119.25° C.), or amorphous sulfur (M. P. 119.25° C.). It is preferred to use the sulfur in a finely-divided solid state such as sublimed sulfur, although the sulfur may first be dissolved or dispersed in an inert solvent liquid such as a carbon disulfide, carbon tetrachloride, and then reacted with the steroid, or the sulfur may first be melted and then reacted with the steroid.

The steroid may be employed initially in solid or liquid form and it is within the scope of the invention to employ the steroid dissolved or dispersed in an inert solvent or liquid such for example as carbon disulfide, carbon tetrachloride or mineral oils. The steroid and sulfur may be dissolved in a single common solvent or in separate, but miscible solvents and then reacted by heating. Valuable mixtures of the new products of the invention are obtained by reacting a mixture of two or more steroids with sulfur. Since the steroids are capable of existing in many stereo-isomeric forms, the reaction product will likewise consist of one or more compounds having the normal (cis) or epi(trans) configuration.

In carrying out the reaction, one mole of a steroid and the stoichiometric amount of sulfur are mixed together and the mixture heated slowly, as in an oil bath, to an elevated temperature such that an exothermic reaction commences, for example, above 112.8° C. The exothermic reaction may be allowed to continue to completion. If a solvent or inert liquid reaction medium is employed, it is evaporated to obtain the sulfur addition product. Whenever an excess of one of the reagents is employed, the excess can be removed, after reaction, by extraction with a suitable solvent.

For each individual steroid there appears to be a critical temperature at which the exothermic addition reaction occurs. Usually the temperature to which the mixture of steroid and sulfur must be heated to commence the reaction is above the melting point of the steroid and of the sulfur, that is, above about 112.8° C. As soon as the critical reaction temperature is reached, an exothermic reaction begins and continues until the addition of sulfur is completed.

By way of illustration, but not by way of limiting the invention, there will be given the following specific example:

1 gram of pure cholesterol and 1.76 grams of solid sublimed sulfur are mixed in a flask and the flask placed in an oil bath. The temperature of the mixture is raised gradually until both substances have melted and is finally raised to 216° C. at which temperature a strong exothermic reaction occurs. The product is a solid reddish sulfur addition product of the steroid containing two atomic weights of sulfur for each mole of cholesterol, and may be called 5,6 thiocholesterol.

In a similar manner there may be prepared the polysulfides of other steroids, for example, the following:

obtained is a steroid polysulfide or thiosteroid characterized by being a solid of high-melting point having a color from red to brown depending upon the increasing amount of sulfur added, and by being insoluble in water, slightly soluble in ethyl alcohol, and soluble in vegetable and mineral oils.

The absorbed compound appears to be in a metabolic form and is biologically active and capable of being utilized by the tissues of the human body for metabolism. The new series of compounds provided by the present invention are indicated as specifics for the treatment of sulfur-deficiency diseases of all types of the general description "thiopeanic."

I claim:

1. A process for producing a thiosteroid containing sulfur attached to the nucleus, comprising heating an unsaturated steroid with sulfur to an elevated temperature above 112.8° C. to cause the steroid and sulfur to react.

2. A process for producing a thiosteroid containing sulfur attached to the nucleus, comprising heating an unsaturated steroid with sulfur to an elevated temperature above 112.8° C. to induce an exothermic reaction between said substances whereby the steroid and sulfur react to form a sulfur-addition compound of the steroid.

3. A process for producing a thiosteroid containing sulfur attached to the nucleus, comprising mixing a solid unsaturated steroid with solid sulfur, melting the mixture and heating the molten mixture to an elevated temperature above 112.8° C. to cause the steroid and sulfur to react.

4. A process for producing a thiosteroid containing sulfur attached to the nucleus comprising heating an unsaturated steroid and sulfur in the presence of a solvent for said substances to a temperature above 112.8° C. to cause the steroid and sulfur to react and recovering the reaction product from the solvent.

5. A process for producing a thiosteroid containing sulfur attached to the nucleus comprising heating one mole of cholesterol with two

| Substance | Side chain R″ | Positions of nuclear groups | | |
|---|---|---|---|---|
| | | OH | =O | Double bonds |
| Ergosterol, $C_{28}H_{45}O$ (trans) | $C_{19}H_{26}(OH)$—CH.CH=CH—CH—CH—CH$_3$, CH$_3$, CH$_3$, CH$_3$ | 3 | | 5,6, 7,8. |
| 7-Dehydrocholesterol, $C_{27}H_{44}O$ (trans) | $C_{19}H_{26}(OH)$—CH.CH$_2$—CH$_2$—CH—CH—CH$_3$, CH$_3$, CH$_3$ | 3 | | 5,6, 7,8. |
| Corticosterone, $C_{21}H_{30}O_4$ | $C_{19}H_{26}(OH)O$—CO—CH$_2$OH | 11 | 3 | 4,5. |
| Progesterone, $C_{21}H_{30}O_2$ | $C_{19}H_{27}O$—CO—CH$_3$ | | 3 | 4,5. |
| Testosterone, $C_{19}H_{28}O_2$ (trans) | $C_{19}H_{27}(OH)O$—No side chain | 17 | 3 | 4,5. |
| Estriol, $C_{18}H_{21}(OH)_3$ | ——do—— | 3, 16, 17 | | 1,2, 3,4, 5,10. |
| α-estradiol, $C_{18}H_{21}(OH)_2$ | ——do—— | 3, 17 | | 1,2, 3,4, 5,10. |
| Estrone, $C_{18}H_{21}(OH)O$ | ——do—— | 3 | 17 | 1,2, 3,4, 5,10. |

The above examples show that the composition of the new series of thiosteroids may vary widely depending upon (a) the nature of the side chains R, R′, R″ (of the formula given above), (b) in the spatial configuration of the nucleus and its substituents, (c) in the number and position of the hydroxyl groups, (d) the number and position of the double bonds and the number and position of the sulfur atoms added.

The sulfur-addition product of the steroid thus atomic weights of sulfur to an elevated temperature above 112.8° C. to cause the cholesterol and sulfur to react.

6. As a new product, a thiosteroid containing sulfur attached to the steroid nucleus.

7. As a new product, a thiosteroid containing not less than two sulfur atoms attached directly to the steroid nucleus.

8. A a new product, 5,6,thiocholesterol.

RUDOLPH REBOLD.